(12) United States Patent
Kuekes et al.

(10) Patent No.: US 7,405,866 B2
(45) Date of Patent: Jul. 29, 2008

(54) COMPOSITE MATERIAL WITH CONTROLLABLE RESONANT CELLS

(75) Inventors: Philip J Kuekes, Menlo Park, CA (US); Shih-Yuan Wang, Palo Alto, CA (US); Raymond G Beausoleil, Redmond, WA (US); Alexandre M. Bratkovski, Mountain View, CA (US); Wei Wu, Mountain View, CA (US); M. Saif Islam, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 29 days.

(21) Appl. No.: 10/993,616

(22) Filed: Nov. 19, 2004

(65) Prior Publication Data

US 2006/0109540 A1    May 25, 2006

(51) Int. Cl.
*G02F 1/00* (2006.01)
*G02F 1/03* (2006.01)

(52) U.S. Cl. ..................... 359/321; 359/245

(58) Field of Classification Search ............ 359/238, 359/298, 245, 250, 275
See application file for complete search history.

(56) References Cited

U.S. PATENT DOCUMENTS

| 6,172,793 | B1 | 1/2001 | Heberle et al. | |
|---|---|---|---|---|
| 7,015,865 | B2 | 3/2006 | Isaacs et al. | |
| 2003/0042487 | A1* | 3/2003 | Sarychev et al. | 257/53 |
| 2003/0223721 | A1 | 12/2003 | Povinelli et al. | |
| 2003/0227415 | A1 | 12/2003 | Joannopoulos et al. | |
| 2004/0066251 | A1* | 4/2004 | Eleftheriades et al. | 333/117 |
| 2004/0081414 | A1 | 4/2004 | Barker | |
| 2004/0151876 | A1 | 8/2004 | Tanielian | |

FOREIGN PATENT DOCUMENTS

| EP | 1596470 | 11/2005 |
|---|---|---|
| WO | WO 03/054592 A2 | 7/2003 |
| WO | WO 2004/020186 A2 | 3/2004 |
| WO | WO2004/025783 | 3/2004 |

OTHER PUBLICATIONS

Pendry, J. et al., "Reversing Light With Negative Refraction," Physics Today, 57 [6] 37-43 (Jun. 2004).
Brumfiel, G., "Pentagon Attempts to Bend Light to Its Will," Nature, vol. 428 p. 245 (Mar. 18, 2004).
Yen, T.J. et. al., "Terahertz Magnetic Response from Artificial Materials," Science, vol. 303 pp. 1494-1496 (Mar. 5, 2004).
Smith, D. et. al., "Metamaterials and Negative Refractive Index," Science, vol. 305 pp. 788-792 (Aug. 6, 2004).
Shelby R A et al—"Experimental Verification of a Negative Index of Refraction"—American Association for the Advancement of Science vol. 292 Apr. 6, 2001—pp. 77-79.

* cited by examiner

*Primary Examiner*—Scott J. Sugarman
*Assistant Examiner*—Dawayne A Pinkney (57) ABSTRACT

An apparatus for controlling propagation of incident electromagnetic radiation is described, comprising a composite material having electromagnetically reactive cells of small dimension relative to a wavelength of the incident electromagnetic radiation. At least one of a capacitive and inductive property of at least one of the electromagnetically reactive cells is temporally controllable to allow temporal control of an associated effective refractive index encountered by the incident electromagnetic radiation while propagating through the composite material.

38 Claims, 8 Drawing Sheets

COMPOSITE MATERIAL WITH CONTROLLABLE RESONANT CELLS

FIELD

This patent specification relates generally to controlling electromagnetic propagation for optical modulation, optical switching, or any of a variety of other useful purposes.

BACKGROUND

Devices for temporal control of the propagation of electromagnetic radiation represent fundamental building blocks for many modern technologies. Where a single spatial dimension is involved, such as in the propagation of a fiber optic communications signal down an optical fiber, such control is commonly achieved by devices affecting the amplitude of the propagating light (e.g., OFF/ON). In that environment, one-dimensional electrooptical modulators are often used that are based on electrooptic and/or magnetooptic materials such as calcite, quartz, and lithium niobate that change their refractive index responsive to applied control signals, the materials being arranged into Mach-Zehnder interferometers (MZIs) or similar devices converting induced phase changes into amplitude changes by interference effects. Other one-dimensional electrooptical modulators include electroabsorption modulators variably absorbing the incident signal according to an applied electric field, and acoustic wave modulators using high-frequency sound traveling within a crystal or a planar wave guide to deflect light from one place to another. Among other issues, such as limited power-handling ability, the above modulators each have substantial bandwidth limitations, e.g., practical limits to the speed at which they can vary the output signal between ON and OFF. By way of example, the maximum bit rate of many of the above electrooptic/magnetooptic effect modulators, as well as many of the above electroabsorption modulators, is on the order of 10-40 GHz, while many acoustic wave modulators have an even lower maximum bit rate.

Where two spatial dimensions are involved, e.g., in the controlled propagation of electromagnetic wavefronts in imaging systems, devices for temporal control of the propagating radiation include liquid crystal-based spatial light modulators (SLMs) and microelectromechanical (MEMs)-based SLMs, each generally providing for pixelwise amplitude or phase modulation of the propagating radiation. Among other issues, each of these SLM types has substantial bandwidth limitations. Although some liquid-crystal SLMs may use optical control signals rather than electrical control signals, pixel response times are nevertheless on the order of microseconds (binary) or milliseconds (analog). Typical response times for so-called digital micromirror devices, one type of commercially available MEMs SLM, are on the order of microseconds. Other issues relating to the above devices for one- or two-dimensional control of propagating radiation include power consumption, power handling ability, size, and environmental considerations.

One particular scenario involving control of the propagation of electromagnetic radiation relates to coupling pump laser light into a target device. This can be a desirable objective in many cases, such as for optically pumping the core of an erbium-doped fiber amplifier (EDFA) using pump light from a semiconductor diode laser. In order to facilitate higher power (e.g., one watt or greater) without damaging the semiconductor diode laser, the facet of semiconductor diode laser is often made relatively large. The transverse spatial modes of the semiconductor diode laser can become quite irregular, and light can be emitted with a numerical aperture on the order of 0.3-0.4, for example. However, the EDFA core usually has a small circular mode and can only receive light with a smaller numerical aperture on the order of 0.2, for example. Coupling the pump light into the EDFA core using a tapered optical fiber and cylindrical lens can yield relatively low efficiencies. More generally, it may be a desirable objective to couple source radiation from a source device having a first transverse spatial mode pattern into a target device having a second transverse spatial mode pattern that may be substantially different than the first transverse spatial mode pattern.

Accordingly, in relation to at least one of the above one-dimensional and two-dimensional contexts, it would be desirable to control the propagation of electromagnetic radiation in a manner that at least partially resolves one or more of the above issues. It would be further desirable to provide one or more useful devices based on such control capabilities.

SUMMARY

In accordance with an embodiment, an apparatus is provided for controlling propagation of incident electromagnetic radiation, comprising a composite material having electromagnetically reactive cells of small dimension relative to a wavelength of the incident electromagnetic radiation. At least one of a capacitive and inductive property of at least one of the electromagnetically reactive cells is temporally controllable to allow temporal control of an associated effective refractive index encountered by the incident electromagnetic radiation while propagating through the composite material.

Also provided is a method for controlling propagation of incident electromagnetic radiation, comprising placing a composite material in the path of the incident electromagnetic radiation, the composite material comprising resonant cells of small dimension relative to a wavelength of the incident electromagnetic radiation. The method further comprises temporally controlling at least one of a capacitive and inductive property of at least one of the resonant cells to temporally control an associated effective refractive index encountered by the incident electromagnetic radiation while propagating through the composite material.

Also provided is an apparatus comprising a composite material, the composite material comprising electromagnetically reactive cells, the apparatus further comprising means for applying incident radiation upon a surface of the composite material for propagation therethrough. The incident radiation has a wavelength substantially larger than a size of each of the electromagnetically reactive cells. The apparatus further comprises means for temporally controlling at least one of a capacitive and inductive property of at least one of the electromagnetically reactive cells to facilitate temporal control of an associated effective refractive index encountered by the incident radiation while propagating through the composite material.

Also provided is an optical transistor, comprising a signal input receiving a signal beam, a control input receiving a control beam, and a composite material comprising resonant cells of small dimension relative to a wavelength of the signal beam. The composite material forms a surface receiving the signal beam from the signal input, the surface also receiving the control beam from the control input. At least one of a capacitive and inductive property of the resonant cells is controlled by the control beam for controlling an effective refractive index of the composite material across the surface. An output signal is formed by the signal beam upon propagation through the resonant cells as controlled by the control beam.

Also provided is a coupling apparatus for coupling source radiation from a source device having a first transverse spatial mode pattern into a target device having a second transverse spatial mode pattern. The coupling apparatus comprises a composite material having resonant cells exhibiting a negative effective refractive index at a frequency of the source radiation, the composite material receiving the source radiation from the source device. At least one of an inductive and capacitive property of the resonant cells is spatially varied thereamong to cause the source radiation received from the source device to be imaged onto the second transverse spatial mode pattern of the target device.

Also provided is a method for coupling source radiation from a source device having a first transverse spatial mode pattern into a target device having a second transverse spatial mode pattern. A composite material is placed in a path of the source radiation, the composite material having resonant cells exhibiting a negative effective refractive index at a frequency of the source radiation. At least one of an inductive and capacitive property of the resonant cells is spatially varied thereamong to cause the source radiation received from the source device to be imaged onto the second transverse spatial mode pattern of the target device.

DETAILED DESCRIPTION

Figure 1:
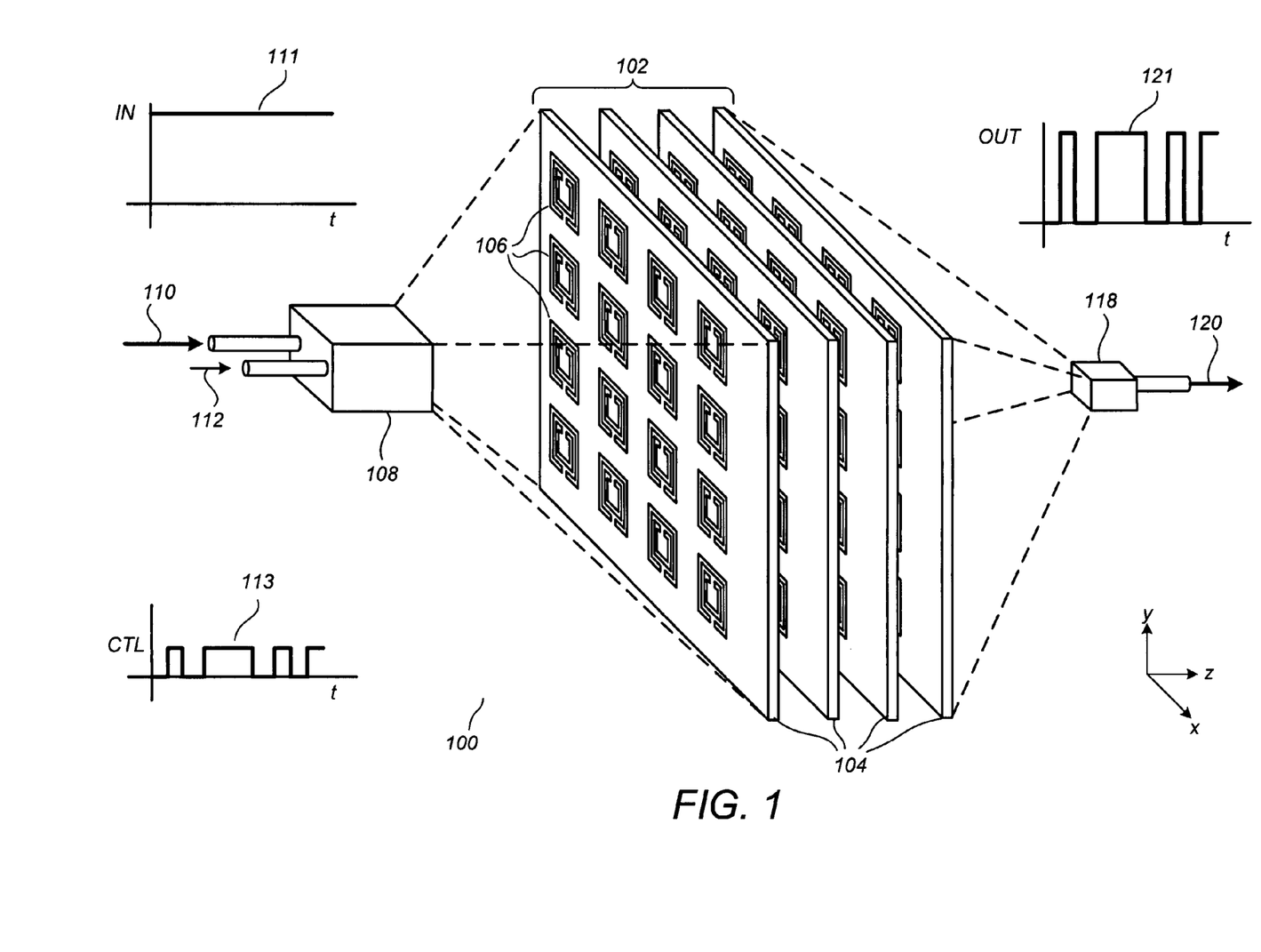
FIG. 1 illustrates an apparatus for controlling the propagation of incident electromagnetic radiation according to an embodiment.

FIG. 1 illustrates an apparatus 100 for controlling the propagation of incident electromagnetic radiation according to an embodiment. Apparatus 100 comprises a composite material 102 comprising an arrangement of electromagnetically reactive or resonant cells 106 formed on one or more substrates, forming planar arrays 104. Apparatus 100 further comprises an input optical system 108 receiving incident electromagnetic radiation in the form of a signal beam 110, and further receiving control radiation in the form of a control beam 112. In the embodiment of FIG. 1, the signal beam 110 and control beam 112 are one-dimensional beams of light being provided, for example, over optical fibers to the input optical system 108. Apparatus 100 further comprises an output optical system 118 receiving the incident electromagnetic radiation after propagating through the composite material 102 and emerging as an output beam 120.

Although propagation of optical signals (e.g., infrared, visible, ultraviolet) is discussed herein, it is to be appreciated that the scope of the present teachings is not limited to optical signals, but rather can include any type of electromagnetic radiation, ranging from radio frequency radiation and microwaves to x-ray radiation, that can be introduced into a composite material and received or collected after propagating through the composite material. Notably, although presented in terms of examples in which radiation propagates into a composite material from one end and emerges from the other end (e.g., left to right on the drawing pages), propagation as used herein can also refer to reflective cases in which radiation propagates into a composite material from one end and emerges from that same end.

The resonant cells 106 of composite material 102 are preferably of small dimension (e.g., 20 percent or less) compared to a wavelength of the signal beam 110. Unless indicated otherwise, radiation characterized herein by a stated wavelength is presented in terms of a free-space wavelength, with a frequency of that radiation being equal to the free-space speed of light divided by the stated wavelength. Although the individual response of any particular resonant cell 106 to an incident wavefront can be quite complicated, the aggregate response the resonant cells 106 can be described macroscopically, as if the composite material 102 were a continuous material, except that the permeability term is replaced by an effective permeability and the permittivity term is replaced by an effective permittivity. Accordingly, the term artificial material or metamaterial can sometimes be used to refer to the composite material 102.

In the particular example of FIG. 1, each resonant cell 106 comprises a solenoidal resonator that includes a pattern of conducting material having both capacitive and inductive properties. In the particular example of FIG. 1 the conducting material is formed into a square split ring resonator pattern, but other patterns can be used including, for example, circular split ring resonator patterns, swiss roll patterns, or other patterns exhibiting analogous properties. By way of example and not by way of limitation, the signal beam 110 may be at a wavelength of 1.55 μm, in which case the resonant cell dimension should be less than about 300 nm, with better performance being exhibited where that dimension is about 150 nm or less.

The composite material 102, comprising planar arrays 104 of resonant elements 106 described herein, is generally amenable to fabrication using photolithographic techniques and/or nanoimprint lithography techniques. Although many different sizes are possible, the composite material 102 can comprise a square 1K×1K array of resonant elements 106 occupying an area of about 0.3 mm×0.3 mm. The substrate material for the planar arrays 104 should be substantially non-absorbing for light at the wavelength of the signal beam 110. Accordingly, a substrate material comprising GaAs or Si can be suitable for a signal beam wavelength of 1.55 μm, although the scope of the present teachings is not so limited.

One salient feature of the split-ring resonator pattern of each resonant cell 106, or analogous structures according to the present teachings, is that it brings about an inductive property and a capacitive property that can interact to cause a resonance condition in the presence of electromagnetic radiation at particular frequencies. Generally speaking, when the resonant cells 106 are placed in regular arrayed arrangements such as those of FIG. 1, this resonance condition is associated with a capability of neighborhoods of the resonant cells 106 to exhibit negative effective permeability and/or negative effective permittivity. The composite material 102, or a neighborhood of resonant cells 106 therein, is said to have a negative effective refractive index when the effective permeability and effective permittivity are simultaneously negative. In one embodiment, the composite material 102 is formed into a so-called superlens capable of imaging with very high resolutions, even exceeding the diffraction limitations of positive-index optical devices.

According to an embodiment, at least one of a capacitive and inductive property of one or more of the resonant cells 106 is temporally controlled to achieve temporal control of the effective refractive index in the neighborhood of the controlled cells. Because the resonance condition is highly sensitive to these properties, it can be controlled and manipulated with even small changes to the local environment affecting these properties. In one embodiment, an electrical carrier population within the substrate is externally controlled, preferably by introducing control radiation, i.e., the control beam 112, into that cell having a frequency different than the frequency of the signal beam 110. The presence of carriers (e.g., electrons or holes) affects the capacitive and/or inductive properties by amounts sufficient to alter, and optionally to destroy, the resonance condition so that substantial and useful control of the effective refractive index is achieved. Notably, the presence of carriers can also affect the intrinsic refractive index of the substrate material, such as when the substrate material comprises GaAs. Even though this intrinsic refractive index only changes by a very small amount, e.g., in the range of 0.1%-1%, this can be enough to alter the resonance condition.

Preferably, the substrate material near the conductors of the resonant cells 106 is configured and adapted to undergo carrier population variations responsive to receiving radiation at the frequency of the control beam 112. In one embodiment, the substrate comprises semiconductor material having a bandgap energy and a corresponding bandgap radiation frequency, wherein the control beam frequency lies at or above that bandgap radiation frequency. Control radiation is absorbed and carriers created to control the effective refractive index. In contrast, the signal beam 110 is preferably at a frequency below the bandgap radiation frequency, and therefore the signal radiation is not absorbed and does not appreciably affect the creation of carriers. Accordingly, propagation of the signal beam 110 is controlled by the control beam 112 through variations in the effective refractive index. Notably, control of the effective refractive index can be both spatial and temporal, and therefore a wide variety of useful devices can be achieved in accordance with the present teachings, including one-dimensional optical modulators and two-dimensional spatial light modulators. Spatiotemporal control of the signal beam by the composite material is primarily in the form of phase changes induced on the wavefronts incident to the composite material.

By way of example and not by way of limitation, a GaAs substrate as may be used in the composite material 102 may have a bandgap energy of about 1.43 eV. This corresponds to a bandgap radiation frequency corresponding to a wavelength of 867 nm. The control beam 112 should be at a frequency higher than the bandgap radiation frequency, i.e., at a wavelength less than 867 nm. The signal beam 110 should be at a frequency lower than the bandgap radiation frequency, i.e., at a wavelength greater than 867 nm.

Advantageously, the rises and falls in carrier populations of the GaAs or Si substrates responsive to changes in the control beam 112 can be very brief, allowing for very fast temporal control of the effective refractive index of the composite material 102, whether it be on a spatially varying basis or uniformly across the surface as a whole. Very fast modulation rates are therefore possible, even on the order of 100 GHz where the carrier population rise and fall times are on the order of picoseconds.

The apparatus 100 of FIG. 1 is configured as an optical transistor according to an embodiment, wherein the signal beam 110 is modulated by the control beam 112 to generate the output beam 120. In particular, the amplitude of the control beam 112 (see FIG. 1, plot 113, "CTL") is modulated between a (i) first value (on) that causes the composite material 102 to properly focus the signal beam 110 (see FIG. 1, plot 111, "IN") onto the output optical system 118 (see FIG. 1, plot 121, "OUT"), and (ii) a second value ("off") that causes the composite material 102 not to properly focus the signal beam 110 onto the output optical system 118. Notably, any of a variety of different effective refractive index values and profiles can achieve the "off" state, such as defocusing or beam redirections. In one embodiment, the "off" state is achieved by quickly and completely destroying the resonance conditions needed for negative effective refractive index across the entire composite material 102, and then just as quickly restoring the resonance condition for the "on" state.

Input optical system 108 and output optical system 118 comprise positive-index imaging systems capable of achieving the functionalities described herein. By way of example, the input optical system 108 can comprise a fiber optic coupler that combines the signal beam 110 and the control beam 112 into a single beam. The input optical system 108 can then comprise an imaging lens that images that single beam onto the larger area of the first planar array 104 of the composite material 102. The output optical system 118 can comprise any of a variety of optical systems designed to collect and guide the output beam 120. The input optical system 108 and output optical system 118 may be separated from the front and back surfaces of the composite material, respectively, by distances on the order of 10-500 μm. Advantageously, where the composite material 102 comprises a "perfect lens", the numerical aperture requirements are very modest and low-cost light collection devices can be used.

Figure 2:
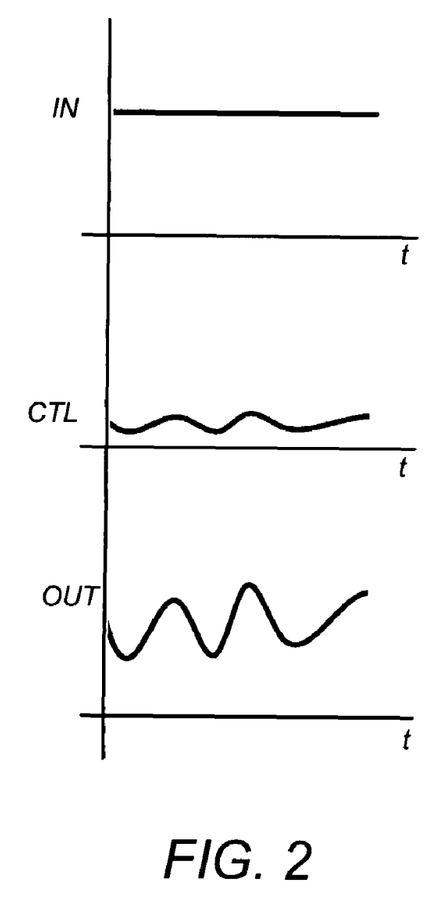
FIGS. 2 and 3 illustrate signal waveforms associated with the apparatus of FIG. 1 according to an embodiment.
Figure 3:
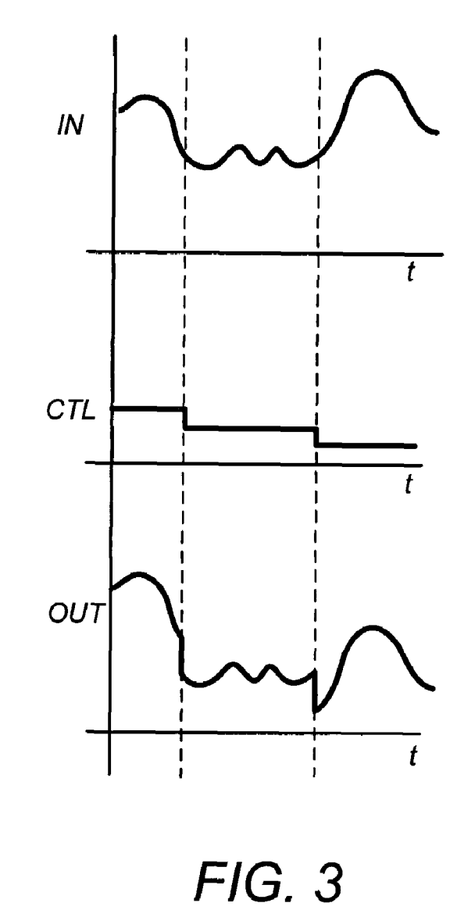

Practical uses for ON/OFF modulation of a constant-level signal beam, as shown in the waveforms illustrated in FIG. 1, include optical gating and wavelength conversion. FIGS. 2 and 3 illustrate alternative signal waveforms that can be associated with the apparatus of FIG. 1 according to other embodiments. FIG. 2 illustrates analog modulation of a constant-level signal beam, effectively performing an analog amplification (and wavelength conversion) of the control beam. This analog implementation can be achieved using fine temporal variations of the control beam sufficiently precise to achieve small changes in the effective refractive index of the composite material 102. This can be contrasted with alternative embodiments in which negative effective index characteristics are entirely created and destroyed in a binary manner. FIG. 3 illustrates level control of an analog signal beam that can be similarly implemented with fine temporal variations of the control beam.

Figure 4:
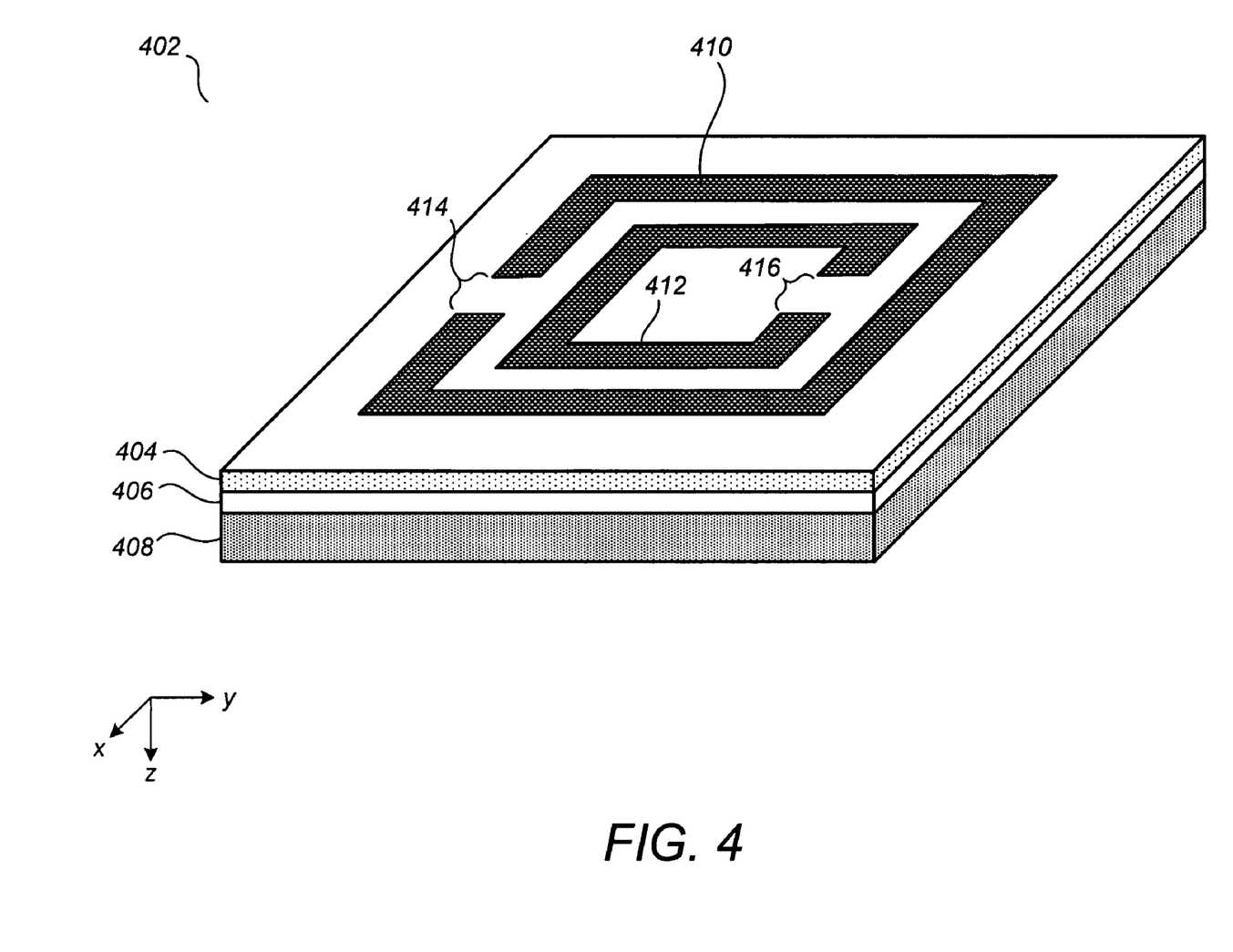
FIG. 4 illustrates a perspective cut-away view of a resonant cell according to an embodiment.

FIG. 4 illustrates a perspective cut-away view of a resonant cell 402 that can be used in the composite material 102 of FIG. 1 according to an embodiment. In one embodiment, an outer conductor 410 and an inner conductor 412 of a solenoidally resonant structure are formed on a substrate comprising a p-doped GaAs upper layer 404 and a p-doped GaAs middle layer 406, the middle layer 406 being more heavily doped than the upper layer 404. The substrate further comprises a support layer 408 comprising semi-insulating GaAs, either undoped or compensated. A metal-semiconductor interface is formed between the upper layer 404 and the conductors 410 and 412, and carriers created by photon absorption flow thereacross to substantially alter at least one of a capacitive and inductive property of the resonant cell 402 according to an intensity of the received control radiation.

Notably, the present teachings are directed to any of a variety of mechanisms that can alter at least one of a capacitive and inductive property of the resonant cell 402 responsive to control light at a different wavelength than the signal light. In other embodiments, n-doped material can be placed in the upper layer 404. In still other embodiments, a single semi-insulating layer of GaAs or Si can be used, the modest carrier populations nevertheless altering the resonance condition by amounts sufficient to change the effective refractive index.

Figure 5:
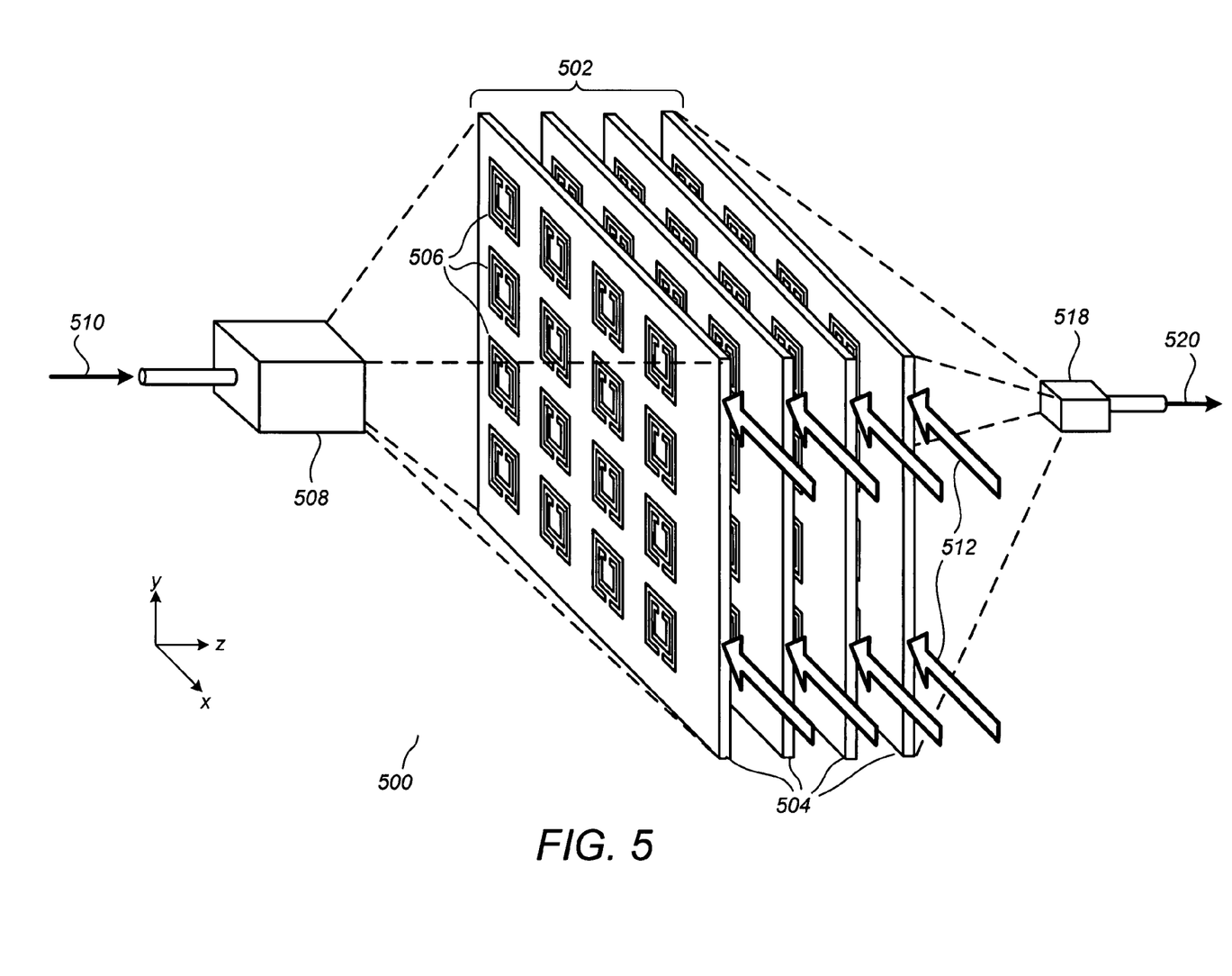
FIG. 5 illustrates an apparatus for controlling the propagation of incident electromagnetic radiation according to an embodiment.

FIG. 5 illustrates an apparatus 500 for controlling the propagation of incident electromagnetic radiation according to an embodiment, comprising a composite material 502 having an arrangement of resonant cells 506 formed on one or more substrates, forming planar arrays 504. Apparatus 500 further comprises an input optical system 508 receiving incident electromagnetic radiation in the form of a signal beam 510, and further comprises an output optical system 518 receiving the signal radiation after propagating through the composite material 502 and emerging as an output beam 520. One or more incident control signals 512 is introduced into the edges of the substrates as indicated in FIG. 5 to achieve temporal, one-dimensional control of the signal beam 510 through substrate carrier population control. In one embodiment, the substrates are configured to allow the control signals 512 to laterally "flood" the substrate area, while in another embodiment waveguiding can be used to guide the light to the resonant cells 506. One potential advantage of the configuration of FIG. 5 is that the control light can be evenly distributed on an individual basis among the planar arrays 504, in contrast to the embodiment of FIG. 1 in which subsequent layers can receive less control light due to absorption in the prior layers. In another embodiment, the control light can be distributed among the planar arrays 504 according to a desired control profile.

Figure 7:
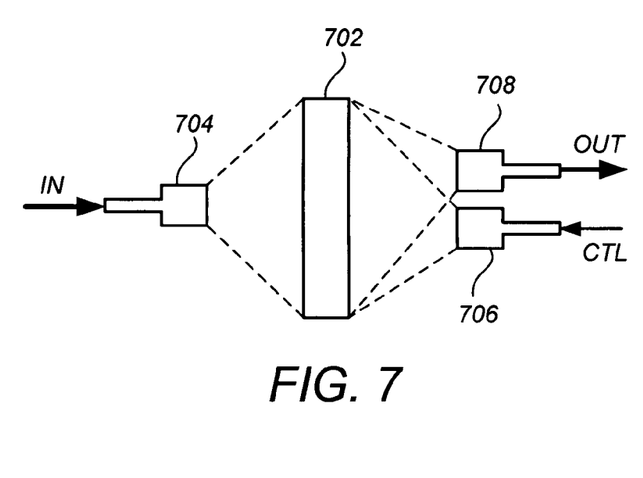
Figure 8:
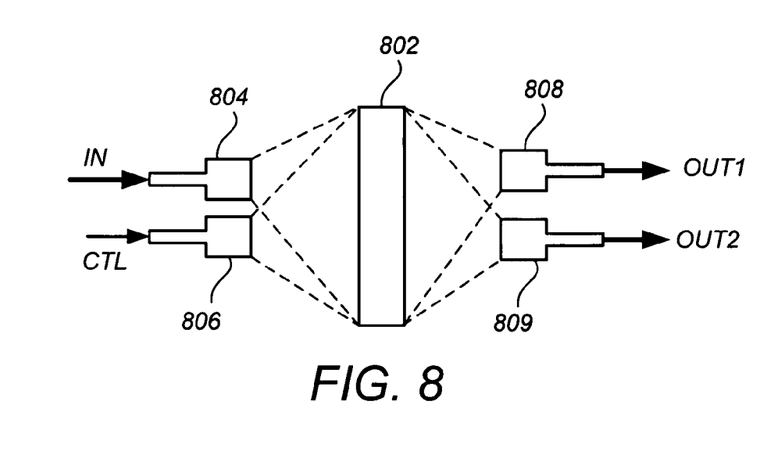

It is to be appreciated that FIG. 1 and FIG. 5 represent only some of the various ways that control light can be applied to the composite material according to the present teachings. The control light can be applied from the front, from the back, from sides, etc., without departing from the scope of the present teachings. For example, FIGS. 6-8 illustrate configurations for controlling signal beams (IN) with control beams (CTL) using composite materials 602, 702, and 802, respectively, to produce output beams (OUT) according to still other embodiments.

Figure 6:
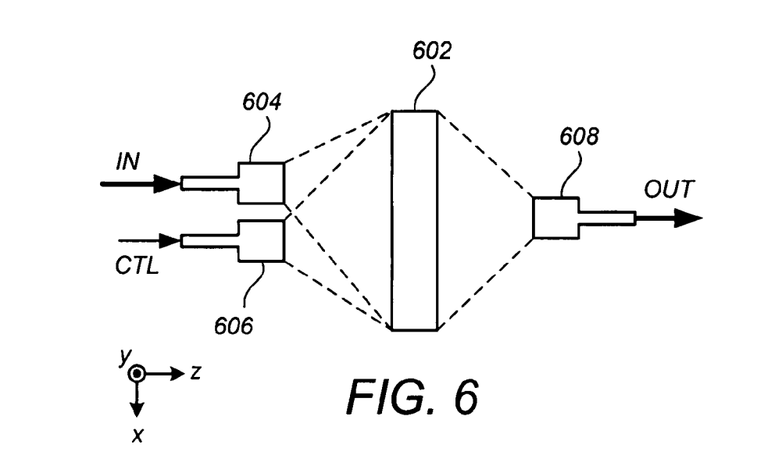
FIGS. 6-8 illustrate top views of devices for controlling the propagation of incident electromagnetic radiation according to one or more embodiments.

In the example of FIG. 6, the signal beam and control beam are separately applied to a front receiving surface of the composite material 602 using a signal input optical system 604 and a control input optical system 606, respectively. The control input optical system 606 is configured to cause the control beam to impinge upon the composite material 602 according to an intensity pattern that causes the signal beam to be imaged onto the output optical system 608 by varying amounts according to a desired temporal modulation scheme. The example of FIG. 7 achieves similar results using a signal input optical system 704, a control input optical system 706, and an output optical system 708, except that the control input optical system 706 introduces the control light onto the back of the composite material 702. The example of FIG. 8 achieves two-way switching using a signal input optical system 804 and a control input optical system 806 wherein, for a first state of the control beam, the composite material 802 focuses the signal beam onto a first output optical system 808, and for a second state of the control beam, the composite material 802 focuses the signal beam onto a second output optical system 808.

Figure 9:
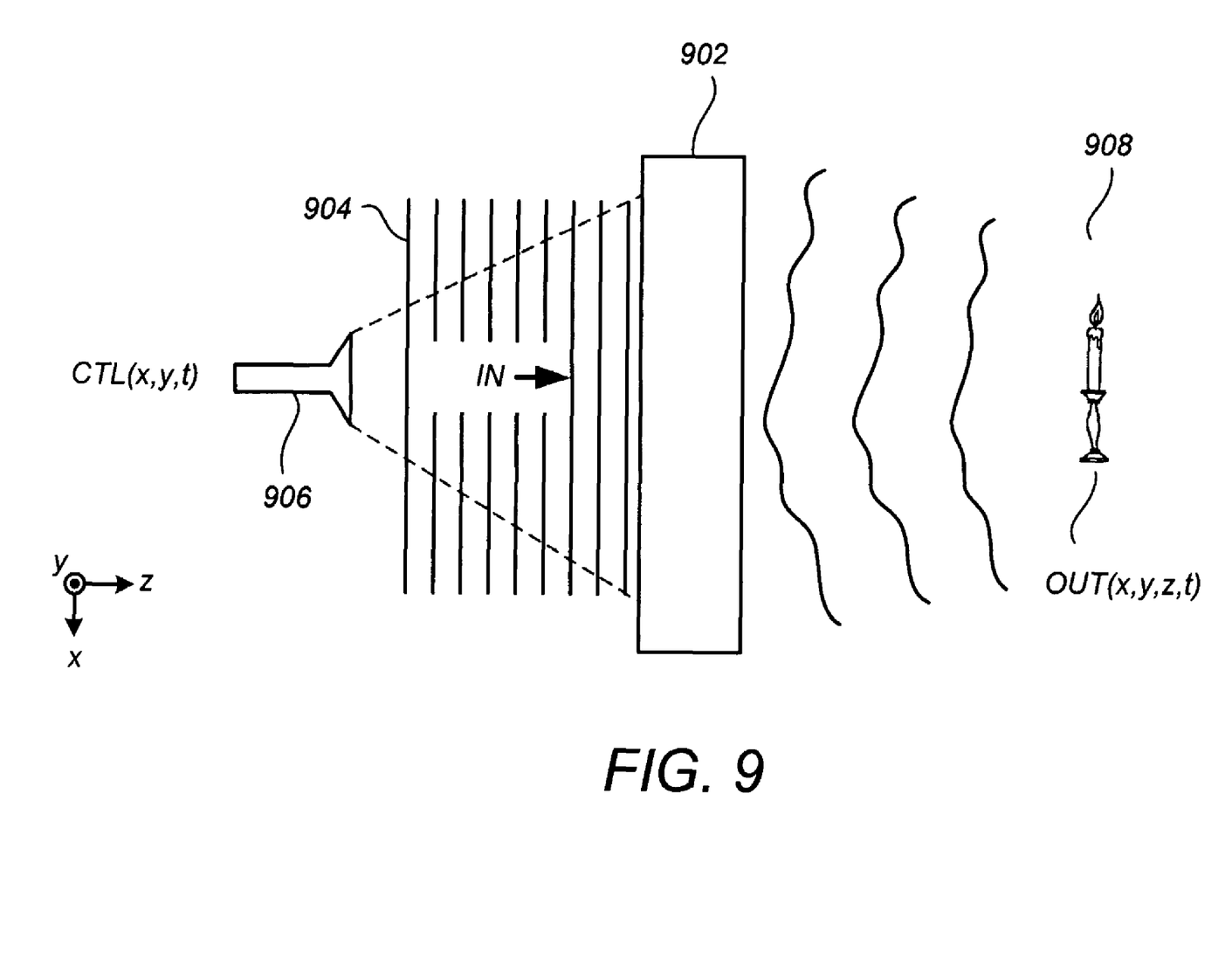
FIG. 9 illustrates an apparatus for controlling the propagation of incident electromagnetic radiation according to an embodiment.

FIG. 9 illustrates an apparatus for controlling the propagation of incident electromagnetic radiation in both a spatial and temporal manner, thereby achieving spatial light modulation functionality. A control beam input system 906 images control light onto a surface of a composite material 902 according to a desired intensity pattern CTL(x,y,t) that causes a corresponding effective refractive index profile to be encountered by an incident signal beam 904 that, for purposes of illustration, is shown as a coherent plane wave. Upon propagation of the signal beam 904 though the composite material 902, it is imaged into a two-dimensional pattern OUT(x, y, t) and/or a desired three-dimensional real image OUT(x, y, z, t) 908 in a holographic manner, i.e., according to desired spatial distribution of phase changes induced at the composite material 902. Advantageously, very fast response times to changes in the control signal CTL(x, y, t) are realized for very fast spatial light modulation. Many different devices for optics, imaging, and/or communications applications can be realized. In one embodiment, the intensity pattern CTL(x, y, t) comprises a binary pattern that, for a first binary value, causes a negative effective refractive index at that location, and for a second binary value, causes a positive effective refractive index at that location. As one of many examples, such devices can be useful for holographic signal encryption/decryption applications. In still another embodiment, the intensity pattern is formed by two control beams, a reference beam and an object beam, each at the control radiation frequency, the reference beam and the object beam being directed toward the front surface of the composite material at different angles similar to the way holograms are recorded onto film emulsions, whereby the resulting intensity pattern comprises a hologram-like interference pattern.

Figure 10:
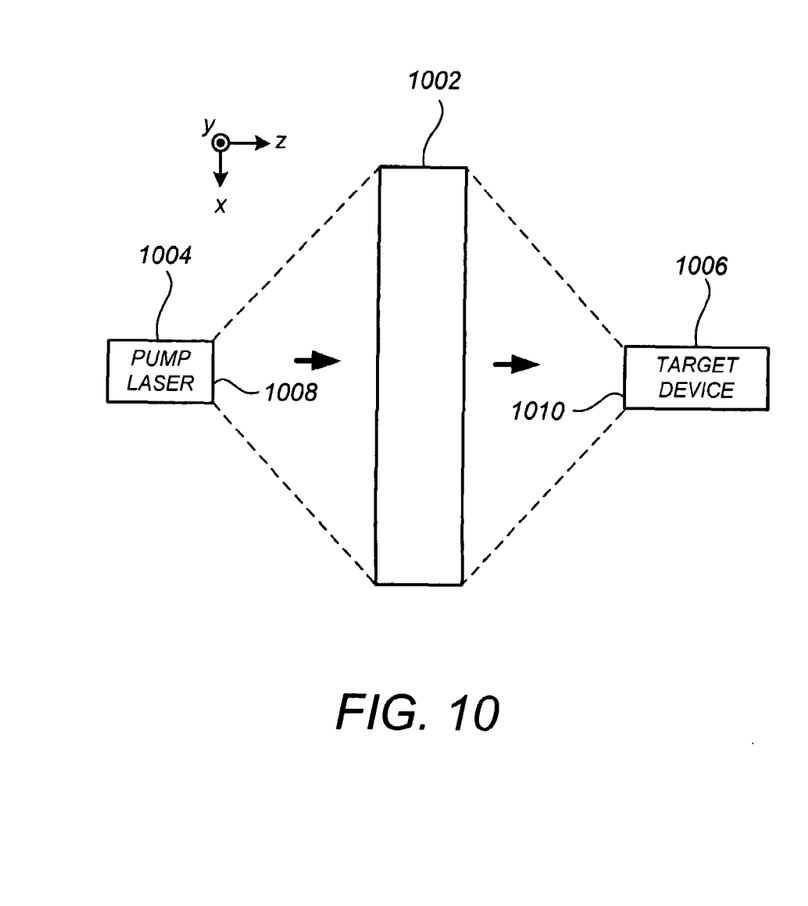
FIG. 10 illustrates a coupling apparatus according to an embodiment.
Figure 11:
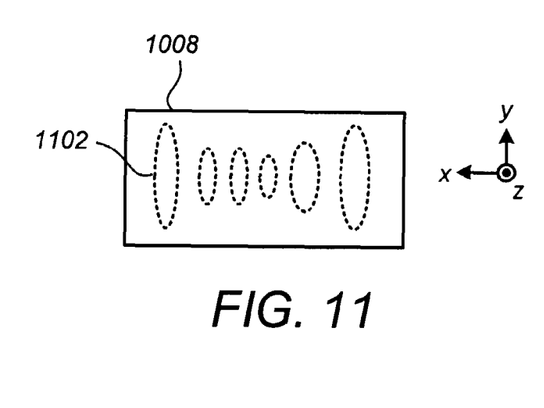
FIGS. 11 and 12 illustrate transverse spatial modes of a source device and a target device, respectively, of FIG. 10.

FIG. 10 illustrates a coupling apparatus for coupling source radiation from a source device (e.g., a pump laser 1004) into a target device 1006 according to an embodiment, the coupling apparatus comprising a composite material 1002. In this example, the pump laser 1004 has an emitting facet 1008 and emits pump light according to an irregular transverse spatial mode pattern, as conceptualized in FIG. 11 showing a first transverse spatial mode pattern 1102, whereas the target device 1006 comprises a receiving surface 1010 and operates according to a second transverse spatial mode pattern 1202 shown in FIG. 12. By way of example, the target device 1006 may be a core-pumped EDFA, while the pump laser 1008 may comprise a semiconductor diode laser, although the scope of the present teachings is not so limited.

Figure 12:
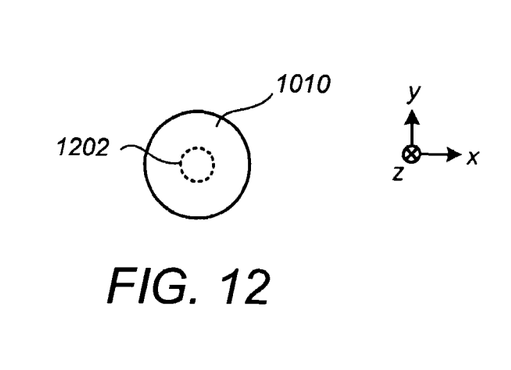

According to an embodiment, the composite material 1002 is configured to have a spatial effective refractive index pattern that images the first transverse spatial mode pattern 1102 onto the second transverse spatial mode pattern 1202. In one embodiment, this effective refractive index pattern can be statically achieved, i.e., according to static resonant cell parameter variations (e.g., material, shape, size) across the composite material. In another embodiment, the effective refractive index pattern is spatially and temporally controlled by spatiotemporal carrier population control in the substrate.

Figure 13:
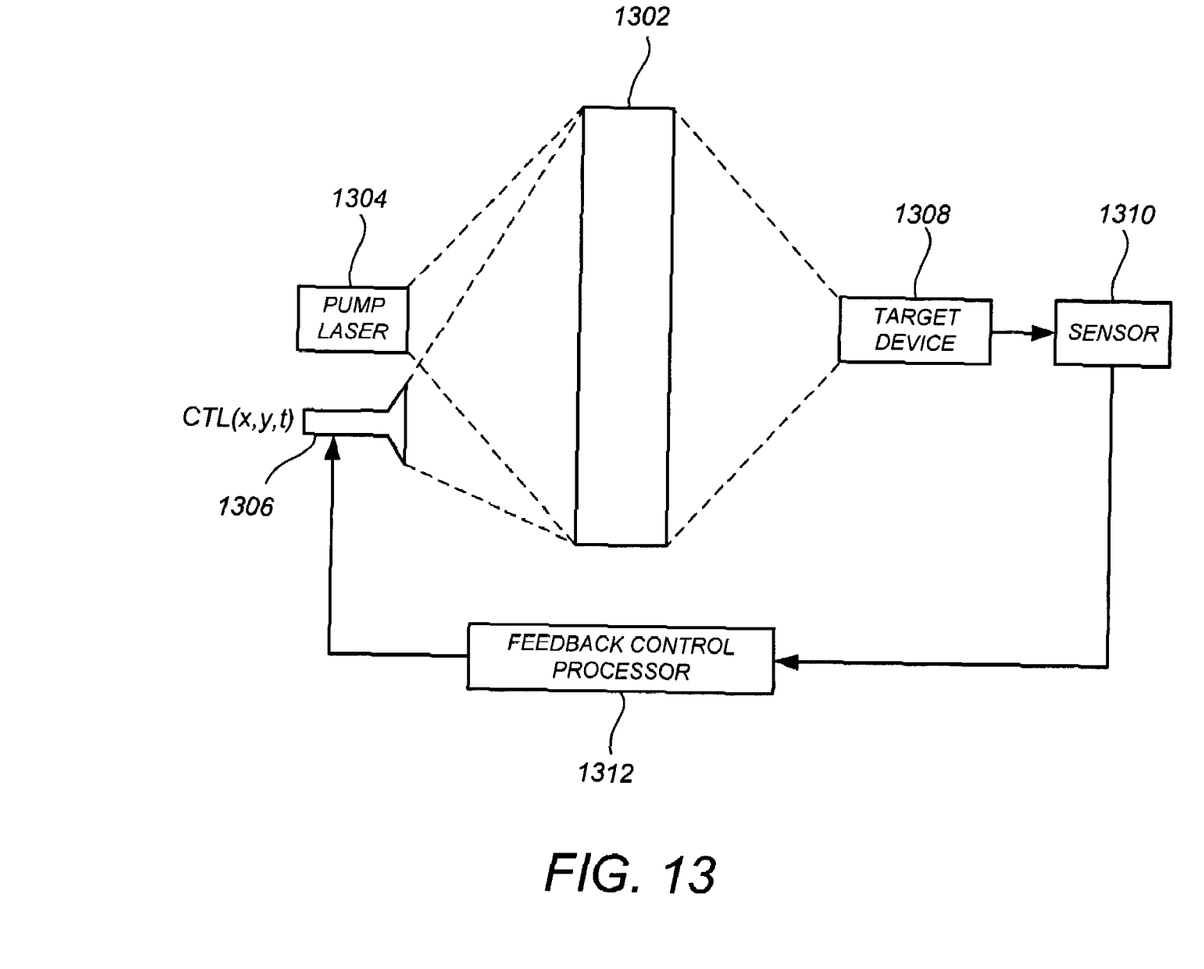
FIG. 13 illustrates a coupling apparatus according to an embodiment.

FIG. 13 illustrates a coupling apparatus for coupling source radiation from a source device (e.g., a pump laser 1304) into a target device 1306 according to an embodiment, the coupling apparatus comprising a composite material 1302, a control input optical system 1306, a sensor 1310, and a feedback control processor 1312. The control input optical system 1306 images control light onto a surface of a composite material 1302 according to a desired intensity pattern CTL(x, y, t) designed to cause the composite material 1302 to image a first transverse spatial mode pattern of the pump laser 1304 a second transverse spatial mode pattern of a target device 1308. The sensor 1310 is configured to sense a coupling efficiency by sensing, for example, an intensity of an output produced by the target device 1308. A feedback control processor 1312 is configured to dynamically modify the intensity pattern CTL(x, y, t) in a manner that improves or optimizes the coupling efficiency.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, while some embodiments supra are described in the context of negative-index materials, the features and advantages of the embodiments are readily applicable in the context of other composite materials. Examples include so-called indefinite materials (see WO 2004/020186 A2) in which the permeability and permittivity are of opposite signs.

By way of further example, it is to be appreciated that the composite material 102 of FIG. 1 represents a simplified example for clarity of description, showing only a single set of planar arrays 104 aligned along a direction of propagation. In other embodiments a second set of planar arrays can be provided perpendicular to the first set of planar arrays 104 for facilitating negative effective permittivity and/or negative effective permeability for more directions of propagation. In still other embodiments, a third set of planar arrays can be provided perpendicular to both the first set and second sets of planar arrays for facilitating negative effective permittivity and/or negative effective permeability for even more directions of propagation. It is to be further appreciated that one or more additional sets of composite and/or continuous-material planes can be placed between the planar arrays 104 without departing from the scope of the present teachings. By way of example, planar arrays consisting of vertical conducting wires on a dielectric support structure can be interwoven with planar arrays 104 to provide a more negative effective permittivity for the overall composite material 100. It is to be further appreciated that the number of resonant cells 106 on the planar arrays 102 can be in the hundreds, thousands, or beyond depending on the overall desired dimensions and the desired operating wavelength.

By way of further example, the temporally controlled resonant cells can be implemented on only a portion of a larger composite material, or in association a subset of the possible directions of an anisotropic composite material, or interleaved in one or more directions with a continuous material as part of a larger composite material, without departing from the scope of the embodiments. By way of still further example, electrical carrier injection into the resonant cells, if achievable without destroying the resonance conditions in other ways, is within the scope of the present teachings. By way of still further example, although devices according to the present teachings can provide for very fast temporal control, such control can of course be provided in a very slow manner to provide static devices having fixed control beams, and/or quasi-static devices having control beams that are altered very rarely, e.g. once every day, month, or year in a manner similar to the way flashable memory devices are controlled. Thus, reference to the details of the described embodiments are not intended to limit their scope.

What is claimed is:

1. An apparatus for controlling propagation of incident electromagnetic radiation, comprising a composite material having electromagnetically reactive cells of small dimension relative to a wavelength of the incident electromagnetic radiation, wherein at least one of a capacitive and inductive property of at least one of said electromagnetically reactive cells is temporally controllable to allow temporal control of an associated effective refractive index encountered by the incident electromagnetic radiation while propagating through said composite material, each of said electromagnetically reactive cells comprising at least one electrical conductor and a substrate, said temporal control comprising controlling a carrier population within said substrate, said substrate comprising a semiconductor material having a bandgap energy, said wavelength of said incident electromagnetic radiation corresponding to a first frequency below a bandgap radiation frequency corresponding to said bandgap energy, said carrier population being controlled by introducing control radiation into said electromagnetically reactive cells at a second frequency at or above said bandgap radiation frequency, said electromagnetically reactive cells forming a surface receiving the incident electromagnetic radiation, further comprising a modulation input device transferring said control radiation onto said surface according to a modulation intensity pattern, said apparatus spatially modulating phase information in said incident electromagnetic radiation according to said modulation intensity pattern.

2. The apparatus of claim 1, wherein said effective refractive index is temporally controlled between a first value less than zero and a second value greater than zero.

3. The apparatus of claim 1, further comprising:
   a signal input receiving said incident electromagnetic radiation for propagation through said composite material;
   an output device positioned to receive an output signal formed by said incident electromagnetic radiation upon propagation through said composite material.

4. The apparatus of claim 3, said output device comprising a spatially fixed receiving surface receiving a variable percentage of said incident electromagnetic radiation according to said modulation intensity pattern, said apparatus forming one of an optical switch, an optical modulator, an optical coupler, and an optical transistor.

5. The apparatus of claim 1, wherein said modulation intensity pattern comprises a two-value pattern in which a first predetermined value causes a positive effective refractive index and second predetermined value causes a negative effective refractive index.

6. The apparatus of claim 1, wherein said modulation intensity pattern is formed by a real image.

7. The apparatus of claim 1, said modulation input device directing a reference beam at said second frequency toward said surface and an object beam at said second frequency toward said surface, said reference beam and said object beam being directed toward said surface at different angles, wherein said modulation intensity pattern comprises an interference pattern between said reference beam and said object beam.

8. The apparatus of claim 1, said incident electromagnetic radiation being received from a source laser having a first transverse spatial mode pattern, wherein said modulation intensity pattern is selected to cause said composite material to image said first transverse spatial mode pattern onto a desired second transverse spatial mode pattern of a target device.

9. The apparatus of claim 8, further comprising a feedback control device to detect a coupling efficiency between said source laser and said target device and to dynamically adjust said modulation intensity pattern to improve said coupling efficiency.

10. A method for controlling propagation of incident electromagnetic radiation, comprising:
placing a composite material in the path of the incident electromagnetic radiation, the composite material comprising resonant cells of small dimension relative to a wavelength of the incident electromagnetic radiation; and
temporally controlling at least one of a capacitive and inductive property of at least one of said resonant cells to temporally control an associated effective refractive index encountered by the incident electromagnetic radiation while propagating through the composite material, each of said resonant cells comprising at least one electrical conductor and a substrate, said temporally controlling comprising controlling a carrier population within said substrate, said substrate comprising a semiconductor material having a bandgap energy, said wavelength of said incident electromagnetic radiation corresponding to a first frequency below a bandgap radiation frequency corresponding to said bandgap energy, said controlling the carrier population comprising introducing control radiation into said resonant cells at a second frequency at or above said bandgap radiation frequency, said resonant cells forming a surface receiving the incident electromagnetic radiation, further comprising transferring said control radiation onto said surface according to a modulation intensity pattern, said resonant cells spatially modulating phase information in said incident electromagnetic radiation according to said modulation intensity pattern.

11. The method of claim 9, wherein said effective refractive index is temporally controlled between a first value less than zero and a second value greater than zero.

12. The method of claim 9, further comprising:
receiving at a signal input said incident electromagnetic radiation for propagation through said composite material; and
receiving at an output device an output signal formed by said incident electromagnetic radiation upon propagation through said composite material.

13. The method of claim 12, said output device comprising a spatially fixed receiving surface receiving a variable percentage of said incident electromagnetic radiation according to said modulation intensity pattern, whereby functionality according to one of an optical switch, an optical modulator, an optical coupler, and an optical transistor is achieved.

14. The method of claim 9, wherein said modulation intensity pattern comprises a two-value pattern in which a first predetermined value causes a positive effective refractive index and second predetermined value causes a negative effective refractive index.

15. The method of claim 9, wherein said modulation intensity pattern is formed by a real image.

16. The method of claim 9, wherein said transferring said control radiation comprises directing a reference beam at said second frequency toward said surface and an object beam at said second frequency toward said surface, said reference beam and said object beam being directed toward said surface at different angles, wherein said modulation intensity pattern comprises an interference pattern between said reference beam and said object beam.

17. The method of claim 9, said incident electromagnetic radiation being received from a source laser having a first transverse spatial mode pattern, wherein said modulation intensity pattern is selected to cause said composite material to image said first transverse spatial mode pattern onto a desired second transverse spatial mode pattern of a target device.

18. The method of claim 17, further comprising detect a coupling efficiency between said source laser and said target device and dynamically adjusting said modulation intensity pattern to improve said coupling efficiency.

19. An apparatus, comprising:
a composite material comprising electromagnetically reactive cells;
means for applying incident radiation upon a surface of said composite material for propagation therethrough, said incident radiation having a wavelength substantially larger than a size of each of said electromagnetically reactive cells; and
means for temporally controlling at least one of a capacitive and inductive property of at least one of said electromagnetically reactive cells to facilitate temporal control of an associated effective refractive index encountered by the incident radiation while propagating through said composite material, each of said electromagnetically reactive cells comprising at least one electrical conductor and a substrate, said means for temporally controlling modulating a carrier population within said substrate, said substrate comprising a semiconductor material having a bandgap energy, said wavelength of said incident electromagnetic corresponding to a first frequency below a bandgap radiation frequency corresponding to said bandgap energy, said carrier population being modulated by introduction of control radiation into said electromagnetically reactive cells at a second frequency at or above said bandgap radiation frequency the apparatus further comprising means for receiving and applying said control radiation onto said surface according to a modulation intensity pattern, said apparatus spatially modulating phase information in said incident electromagnetic radiation according to said modulation intensity pattern.

20. The apparatus of claim 19, wherein said effective refractive index is temporally controlled between a first value less than zero and a second value greater than zero.

21. The apparatus of claim 19, further comprising:
means for receiving an output signal formed by said incident radiation upon propagation through said composite material as modified according to said control radiation.

22. The apparatus of claim 21, said means for receiving an output signal comprising a spatially fixed receiving surface receiving a variable percentage of said incident radiation according to said modulation intensity pattern, said apparatus forming one of an optical switch, an optical modulator, an optical coupler, and an optical transistor.

23. The apparatus of claim 19, wherein said modulation intensity pattern comprises a two-value pattern in which a first predetermined value causes a positive effective refractive index and second predetermined value causes a negative effective refractive index.

24. The apparatus of claim 19, wherein said means for receiving and applying comprises means for forming a real image of said modulation intensity pattern on said surface.

25. The apparatus of claim 19, said means for receiving and applying comprising:
means for directing a reference beam at said second frequency toward said surface; and
means for directing an object beam at said second frequency toward said surface at a nonzero angle with respect to said reference beam;

wherein said modulation intensity pattern comprises an interference pattern between said reference beam and said object beam.

26. The apparatus of claim 19, said incident radiation being received from a source laser having a first transverse spatial mode pattern, wherein said modulation intensity pattern is selected to cause said composite material to image said first transverse spatial mode pattern onto a desired second transverse spatial mode pattern of a target device.

27. The apparatus of claim 26, further comprising:
means for detecting a coupling efficiency between said source laser and said target device; and
means for dynamically adjusting said modulation intensity pattern to improve said coupling efficiency.

28. An apparatus for controlling propagation of incident electromagnetic radiation, comprising a composite material having electromagnetically reactive cells of small dimension relative to a wavelength of the incident electromagnetic radiation, each electromagnetically reactive cell comprising at least one length of conductor disposed along a corresponding length of a substrate, wherein at least one of a capacitive and inductive property of at least one of said electromagnetically reactive cells is temporally controllable by temporal control of a carrier population within said substrate along said corresponding length to allow temporal control of an associated effective refractive index encountered by the incident electromagnetic radiation while propagating through said composite material.

29. The apparatus of claim 28, said substrate comprising a semiconductor material having a bandgap energy, said wavelength of said incident electromagnetic radiation corresponding to a first frequency below a bandgap radiation frequency corresponding to said bandgap energy, said carrier population being controlled by introducing control radiation into said electromagnetically reactive cells at a second frequency at or above said bandgap radiation frequency.

30. The apparatus of claim 28, wherein said substrate comprises a semiconductor material, and wherein said temporal control is achieved by applying control radiation to said semiconductor material.

31. The apparatus of claim 30, wherein said at least one length of conductor forms a solenoidal resonator including a gap, wherein said semiconductor material of said substrate underlies a first area of said solenoidal resonator including said gap and a second area of said solenoidal resonator away from said gap, and wherein said control radiation is applied to each of said first and second areas for temporal control of carrier populations within each of said first and second areas.

32. The apparatus of claim 30, wherein said control radiation is introduced edgewise into said substrate.

33. The apparatus of claim 28, said temporal control being achieved by applying control radiation to said substrate, said electromagnetically reactive cells forming a surface receiving the incident electromagnetic radiation, the apparatus further comprising a modulation input device transferring said control radiation onto said surface according to a modulation intensity pattern, said apparatus spatially modulating phase information in said incident electromagnetic radiation according to said modulation intensity pattern.

34. The apparatus of claim 33, wherein said modulation intensity pattern comprises a two-value pattern in which a first predetermined value causes a positive effective refractive index and second predetermined value causes a negative effective refractive index.

35. The apparatus of claim 33, wherein said modulation intensity pattern is formed by a real image.

36. The apparatus of claim 33, said modulation input device directing a reference beam at said second frequency toward said surface and an object beam at said second frequency toward said surface, said reference beam and said object beam being directed toward said surface at different angles, wherein said modulation intensity pattern compnses an interference pattern between said reference beam and said object beam.

37. The apparatus of claim 33, said incident electromagnetic radiation being received from a source laser having a first transverse spatial mode pattern, wherein said modulation intensity pattern is selected to cause said composite material to image said first transverse spatial mode pattern onto a desired second transverse spatial mode pattern of a target device.

38. The apparatus of claim 37, further comprising a feedback control device to detect a coupling efficiency between said source laser and said target device and to dynamically adjust said modulation intensity pattern to improve said coupling efficiency.

* * * * *

UNITED STATES PATENT AND TRADEMARK OFFICE
CERTIFICATE OF CORRECTION

PATENT NO.         : 7,405,866 B2                                       Page 1 of 1
APPLICATION NO.    : 10/993616
DATED              : July 29, 2008
INVENTOR(S)        : Philip J Kuekes et al.

It is certified that error appears in the above-identified patent and that said Letters Patent is hereby corrected as shown below:

In column 10, lines 32-33, in Claim 3, after "material;" insert -- and --.

In column 12, line 33, in Claim 19, after "radiation frequency" insert -- , --.

In column 13, lines 37-38, in Claim 30, delete "compnses" and insert -- comprises --, therefor.

In column 14, line 11, in Claim 33, delete "transfening" and insert -- transferring --, therefor.

In column 14, line 13, in Claim 33, delete "pattem," and insert -- pattern, --, therefor.

In column 14, line 17, in Claim 34, delete "pattem" and insert -- pattern --, therefor.

In column 14, line 28, in Claim 36, delete "compnses" and insert -- comprises --, therefor.

Signed and Sealed this

Fourteenth Day of July, 2009

JOHN DOLL
*Acting Director of the United States Patent and Trademark Office*